(12) United States Patent
Kwok et al.

(10) Patent No.: US 8,325,012 B2
(45) Date of Patent: Dec. 4, 2012

(54) METHOD FOR OPTIMIZING RFID DEPLOYMENT AND RFID DEPLOYMENT OPTIMIZER OF USE THEREOF

(75) Inventors: Siu Keung Kwok, Hong Kong (CN); Chi Fai Cheung, Hong Kong (CN); Hing Choi Tsang, Hong Kong (CN); Wing Bun Lee, Hong Kong (CN); Burly K. Tan, Hong Kong (CN); Pui Him Ng, Hong Kong (CN); Sze Kit Ho, Hong Kong (CN)

(73) Assignee: PolyU Technology and Consultancy Company Limited, Kowloon, Hong Kong (CN)

( * ) Notice: Subject to any disclaimer, the term of this patent is extended or adjusted under 35 U.S.C. 154(b) by 524 days.

(21) Appl. No.: 12/521,394

(22) PCT Filed: Dec. 27, 2007

(86) PCT No.: PCT/CN2007/003843
§ 371 (c)(1),
(2), (4) Date: Oct. 6, 2009

(87) PCT Pub. No.: WO2008/086703
PCT Pub. Date: Jul. 24, 2008

(65) Prior Publication Data
US 2010/0289621 A1      Nov. 18, 2010

(30) Foreign Application Priority Data
Dec. 28, 2006 (HK) ...................................... 6114212

(51) Int. Cl.
*H04Q 5/22* (2006.01)

(52) U.S. Cl. ..................................................... 340/10.1
(58) Field of Classification Search ................. 340/10.3, 340/10.5, 572.1, 10.1; 358/3.09; 235/385
See application file for complete search history.

(56) References Cited

U.S. PATENT DOCUMENTS

| | | | |
|---|---|---|---|
| 7,154,283 B1 | 12/2006 | Weakley et al. | |
| 2006/0022801 A1* | 2/2006 | Husak et al. | 340/10.5 |
| 2006/0049249 A1* | 3/2006 | Sullivan | 235/385 |
| 2006/0082444 A1* | 4/2006 | Sweeney et al. | 340/10.3 |
| 2006/0212141 A1 | 9/2006 | Abraham et al. | |

(Continued)

FOREIGN PATENT DOCUMENTS

CN      1866036 A      11/2006

(Continued)

OTHER PUBLICATIONS

Patent Cooperation Treaty, International Search Report, 3 pages.

(Continued)

*Primary Examiner* — Jennifer Mehmood
*Assistant Examiner* — Kaleria Knox
(74) *Attorney, Agent, or Firm* — Schwabe, Williamson & Wyatt, P.C.

(57) ABSTRACT

A method for optimizing the deployment of RFID apparatus, and a RFID deployment optimizer of use thereof are provided. The method includes the steps: A. analyzing the interrogation zone where the RFID apparatus are deployed, B. identifying the readability o RFID tag associated with different sets of placement on a target object inside the interrogation zone, and C. selecting the best deployment alternative based on the analysis result of the interrogation zone attained in the step A and all the readabilities of RFID tag associated with different sets of placement identified in the step B.

16 Claims, 10 Drawing Sheets

U.S. PATENT DOCUMENTS

2006/0232382 A1* 10/2006 Bauer et al. .................. 340/10.1
2007/0126578 A1* 6/2007 Broussard .................. 340/572.1

FOREIGN PATENT DOCUMENTS

| | | |
|---|---|---|
| JP | 2003044789 A | 2/2003 |
| WO | 2006069243 A | 6/2006 |

OTHER PUBLICATIONS

Office Action for EP Patent Application 07855844.2, mailed Dec. 1, 2010, 4 pages.

Office Action for Chinese Patent Application 200780048348.6, mailed Mar. 30, 2011, 6 pages.

Office Action for Korean Patent Application 10-2009-7012969, mailed Apr. 27, 2011, 5 pages.

* cited by examiner

METHOD FOR OPTIMIZING RFID DEPLOYMENT AND RFID DEPLOYMENT OPTIMIZER OF USE THEREOF

CROSS-REFERENCE TO RELATED APPLICATIONS

The present application is a national stage application of Patent Cooperation Treaty (PCT) Application No. PCT/CN2007/003843, filed Dec. 27, 2007, which in turn claims priority to Hong Kong Application No. 06114212.7, entitled "METHOD FOR OPTIMIZING RFID DEPLOYMENT AND RFID DEPLOYMENT OPTIMIZER OF USE THEREOF," filed Dec. 28, 2006. These priority applications are incorporated herein by reference in their entireties.

FIELD OF THE INVENTION

The present invention relates to RFID (Radio Frequency Identification) apparatus, especially to the deployment of RFID apparatus.

BACKGROUND OF THE INVENTION

Since the adoption of Radio Frequency Identification (RFID) by major retailers in US and Europe, many vendors and suppliers have been trying to integrate RFID into their production and distribution processes. However, because of different factors and uncertainties, RFID is usually implemented without 100% accuracy. There is not a systematical method to be used to find out a best solution for the RFID deployment in regard to the conformance and performance of the RFID deployment. Traditionally the deployment setup and configuration can only be evaluated and optimized by trial and error, and consequently the design of the RFID deployment is also carried out by trial and error.

On the other hand, most companies may set up the RFID apparatus with neglect of the environmental factors and only reference to the specification of the RFID apparatus. For example, if an RFID system requires 3 meter read range as claimed in the specification, an RFID interrogators (or called RFID reader or controller, etc.) and antennas may be used and set up. However, due to different environment factors, the read range may be reduced or enhanced. If the deployment plan is set based on the specification and trial or error of RFID apparatus products, the performance of the deployment is difficult to be guaranteed and expected, and it may become the failure factor of RFID-based project.

In addition to understand the deployment site, companies should also consider the correct tagging placement to ensure the reading performance. Since different material of the target object and the nature of the contained matters affect the RFID performance, it is also difficult to search for an optimal position for different tagging placements on different target objects or product SKU.

SUMMARY OF THE INVENTION

In view of the problem of the prior art, the objective of the present invention is to provide a method for optimizing RFID deployment and a RFID deployment optimizer of use thereof. The said method and the said RFID deployment optimizer are capable of quickly collecting and analyzing large amount of useful data related to readability of RFID tag in various deployment alternatives so as to enable to optimize RFID deployment in the interrogation zone of the deployed RFID apparatus.

In order to attain the above objective, the present invention provides a method for optimizing the deployment of RFID apparatus that comprises a RFID antenna and a RFID tag. The method includes the following steps:

A. analyzing the interrogation zone (or called read zone, read field, and reader field, etc.) where the RFID apparatus are deployed;

B. identifying the readability of the RFID tag associated with different sets of placement on a target object inside the interrogation zone; and C. selecting the best deployment alternative based on the analysis result of the interrogation zone attained in the step A and all the readabilities of RFID tag identified in the step B.

Preferably, the above step A further includes the following sub-steps:

A-1. placing at least one RFID antenna around the gateway of the interrogation zone;

A-2. placing at least one RFID tag in the interrogation zone associated with one set of placement;

A-3. recording the percentage of successful interactions between each of the at least one RFID antenna and each of the at least one RFID tag associated with the set of placement;

and then repeating the step A-2 and A-3 associated with another set of placement.

Wherein the at least one RFID tag is/are placed at n×m (n>1, m>1) spots which cover the interrogation zone equally. Thereby the step A-2 is carried out as placing a line of m RFID tags in the interrogation zone associated with one set of placement for speeding up the analysis of the interrogation zone.

Preferably, the above step B further includes the following sub-steps:

B-1. placing at least one RFID antenna around the gateway of the interrogation zone;

B-2. placing at least one RFID tag on the target object associated with one set of placement;

B-3. capturing the RFID reading data while the target object is passing through the gateway of the interrogation zone, and identifying the readability of RFID tag associated with the set of placement based on the RFID reading data;

and then repeating the step B-2 and B-3 associated with another set of placement.

For the above method, wherein each set of placement for placing RFID tag comprises the position and the orientation of the RFID tag. More detailed, three sets of position are defined as the front of the target object, the side of the target object and the corner of the target object; at the same time two sets of orientation which could be applied in each position are defined as vertical and horizontal.

Preferably, the above method for optimizing the deployment of RFID apparatus further includes the step D for displaying the analysis result of the interrogation zone graphically in at least one dimension under different spots of view. More preferably, the analysis result of the interrogation zone is displayed in a form of contour map for detailing the size/shape of the interrogation zone and/or the best/worst deploying spot in the interrogation zone; or the analysis result of the interrogation zone is displayed in a form of surface diagram for detailing the size/shape of the interrogation zone and/or the best/worst deploying spot in the interrogation zone.

Preferably, the above method for optimizing the deployment of RFID apparatus further includes the step E for displaying the readability of RFID tag associated with each set of placement graphically. More preferably, the readability of RFID tag associated with each set of placement is displayed in a form of line chart against time.

In addition, the present invention provides a RFID deployment optimizer of use the above method for optimizing the deployment of RFID apparatus that includes RFID antenna and RFID tag. The RFID deployment optimizer comprises a RFID middleware, a database, an analyzer, and an optimizer. The RFID middleware communicates with the RFID apparatus and sends RFID reading data to the database. The database stores the RFID reading data associated with different RFID deployment alternatives. The analyzer analyzes the RFID reading data stored in the database to produce corresponding performance associated with different RFID deployment alternatives. The optimizer connects with the analyzer for selecting the best RFID deployment alternative based on all the performances associated with different RFID deployment alternatives.

Preferably, the above analyzer comprises an interrogation zone analysis unit for analyzing the interrogation zone where the RFID apparatus are deployed, and a tag placement analysis unit for identifying the readability of RFID tag associated with different sets of placement in the interrogation zone.

Preferably, the above RFID deployment optimizer further comprises a visualizer for displaying the analysis result outputted by the analyzer graphically. More preferably, the visualizer displays the analysis result of the interrogation zone in a form of contour map for detailing the size/shape of the interrogation zone and/or the best/worst deploying spot in the interrogation zone; or the visualizer displays the analysis result of the interrogation zone in a form of surface diagram for detailing the size/shape of the interrogation zone and/or the best/worst deploying spot in the interrogation zone; however the visualizer displays the readability of RFID tag in a form of line chart for detailing the readability of RFID tag against time associated with one set of placement.

These and other features, aspects, and embodiments of the invention are described below in the section entitled "Detailed description of the invention."

BRIEF DESCRIPTION OF THE DRAWINGS

FIG. 7-A illustrates the first set of placement for placing RFID tag in accordance with the step B-2 illustrated in FIG. 1;

FIG. 7-B illustrates the second set of placement for placing RFID tag in accordance with the step B-2 illustrated in FIG. 1;

FIG. 7-C illustrates the third set of placement for placing RFID tag in accordance with the step B-2 illustrated in FIG. 1;

FIG. 7-D illustrates the fourth set of placement for placing RFID tag in accordance with the step B-2 illustrated in FIG. 1;

FIG. 7-E illustrates the fifth set of placement for placing RFID tag in accordance with the step B-2 illustrated in FIG. 1;

FIG. 7-F illustrates the sixth set of placement for placing RFID tag in accordance with the step B-2 illustrated in FIG. 1;

DETAIL DESCRIPTION OF PREFERRED EMBODIMENT(S)

Figure 1:
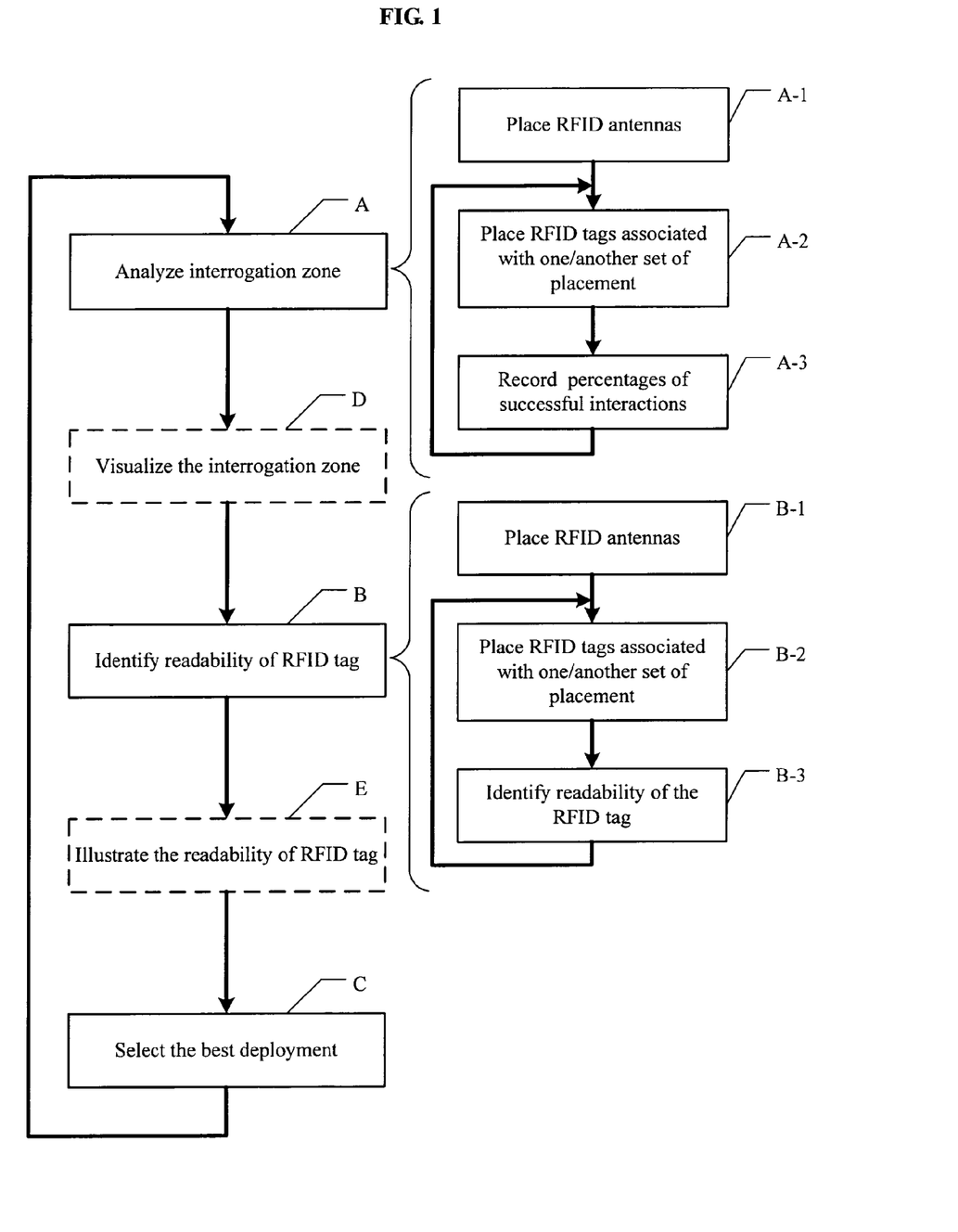
FIG. 1 is a flow chart of a method for optimizing the deployment of RFID apparatus in accordance with an embodiment of the present invention.

As shown in FIG. 1, the method provided by the present invention includes the following steps:

A. analyzing the interrogation zone (or called read zone, read field, and reader field, etc.) where the RFID apparatus are deployed;

D. displaying the analysis result of the interrogation zone graphically in at least one dimension under different spots of view;

B. identifying the readability of RFID tag associated with different sets of placement on a target object inside the interrogation zone;

E. displaying the readability of RFID tag associated with each set of placement graphically; and C. selecting the best deployment alternative based on the analysis result of the interrogation zone attained in the step A and all the readabilities of RFID tag identified in the step B.

Wherein, the step A is necessary since it is framed with real line. The purpose of the step A is to collect testing RFID reading data of the interrogation zone around the gateway and analyze the performance of the interrogation zone based on the RFID reading data. The interrogation zone (or called read zone, read field, reader field etc,) is the area in which a RFID antenna can provide enough energy to request a RFID tag and receive response back from the RFID tag, while RFID tags outside the interrogation zone can not receive enough energy from the RFID antenna to reflect back a response. As shown in FIG. 1, the step A further includes the following sub-steps:

A-1. placing at least one RFID antenna around the gateway of the interrogation zone;

A-2. placing at least one RFID tag in the interrogation zone associated with a set of placement;

A-3. recording the percentage of successful interactions between each of the at least one RFID antenna and each of the at least one RFID tag associated with the set of placement;

and then repeating the step A-2 and A-3 associated with another set of placement.

Figure 2:
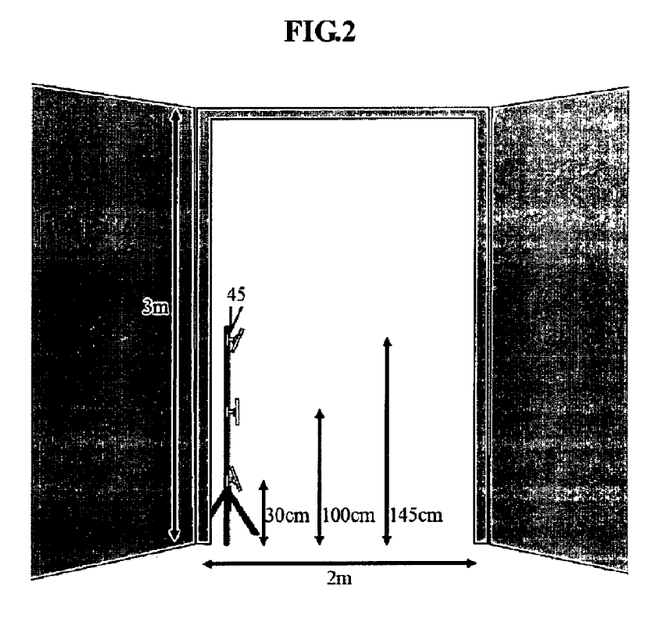
FIG. 2 illustrates placement of RFID antenna in accordance with the step A-1 illustrated in FIG. 1.
Figure 3:
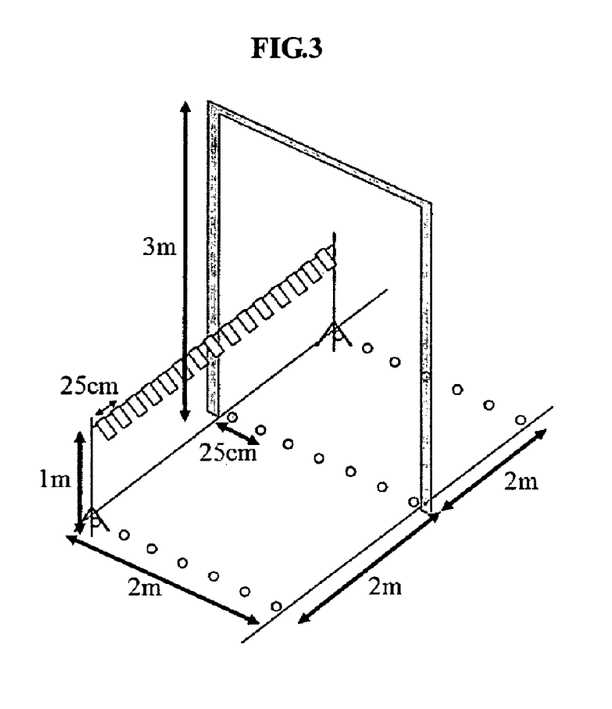
FIG. 3 illustrates placement of RFID tag in accordance with the step A-2 illustrated in FIG. 1.

FIG. 2 illustrates placement of the at least one RFID antenna in accordance with the step A-1, and FIG. 3 illustrates placement of the at least one RFID tag in accordance with the step A-2.

As shown in FIG. 2, a gateway mounting with three antennas is located at one side of the gateway and the height of antennas is 30 cm, 100 cm and 145 cm representatively.

As shown in FIG. 3, in order to analyze the interrogation zone of a 3 m gateway, a 7×15 matrix is defined to make out spots for placing RFID tag and the matrix cover the interrogation zone equally with 25 cm separation of each spot.

In order to understand the performance of the whole interrogation zone, all the spots of the matrix have to be tested. Since the spots are tested one by one traditionally, the environmental factors of the interrogation zone may be inconsistent during the long testing time and as a result the accuracy of the analysis result would not be guaranteed. In order to guarantee the accuracy of the analysis result, the present invention hereby speeds up the analysis by testing a line of fifteen spots simultaneously.

As shown in FIG. 3, the analysis is carried out by a line of fifteen RFID tags, and thereby the number of testing is reduced from 7×15 to 7. In other words, seven testing associated with different sets of placement are performed with different distance between the RFID tags and the RFID antennas starting from 25 cm to 175 cm with 25 cm interval. Every testing have been tested by ten trials and each trial composes 100 interactions (involving requests and response) testing between each RFID antenna and each RFID tag.

The number of requests and responses are recorded. For every trial, the readability of RFID tag at each particular spot is defined as the percentage of successful interactions (i.e. the number of responses over the number of requests) associated with the trial. And for the analysis of the interrogation zone, the readability of RFID tag at each particular spot is determined by the average of the readability of RFID tag for the ten trials.

In addition, in order to further remove testing noise and smooth analysis result, the extreme values (involving the maximum and minimum readability of RFID tag) for the ten trials is eliminated, and then the readability of RFID tag at each particular spot is determined by the average of the readability of RFID tag for the reminding values.

The following Table.1 shows an analysis result of the interrogation zone in accordance with the step A illustrated in FIG. 1. The first column of the Table.1 indicates the different position of the RFID tag alone the line of fifteen RFID tags; the first row of the Table.1 indicates the perpendicular distance between the RFID tag and the RFID antenna; and the readability of RFID tag at each spot within the defined interrogation zone is shown associated with particular spot location information. At the same time, the spots with readability of RFID tag over 90% are highlighted in grey color.

TABLE 1

An analysis result of the interrogation zone attained in the step A.

|         | 25 cm   | 50 cm   | 75 cm   | 100 cm  | 125 cm  | 150 cm  | 175 cm  |
|---------|---------|---------|---------|---------|---------|---------|---------|
| -175 cm | 0.00000 | 0.00000 | 0.00000 | 0.00000 | 0.00000 | 0.00000 | 0.00000 |
| -150 cm | 0.28948 | 0.41327 | 0.00000 | 0.76805 | 0.45483 | 0.00328 | 0.92791 |
| -125 cm | 0.84388 | 0.00000 | 0.00000 | 0.99629 | 1.00000 | 0.93614 | 0.00000 |
| -100 cm | 0.59566 | 0.00000 | 0.99537 | 0.54789 | 0.95383 | 0.96790 | 0.00195 |
| -75 cm  | 0.87737 | 0.95975 | 0.95790 | 0.96223 | 0.78796 | 0.96146 | 0.73820 |
| -50 cm  | 0.93495 | 0.93730 | 1.00000 | 1.00000 | 1.00000 | 0.99672 | 0.85462 |
| -25 cm  | 1.00000 | 0.99719 | 0.99534 | 1.00000 | 1.00000 | 0.59773 | 0.98816 |
| 0       | 0.99654 | 1.00000 | 1.00000 | 1.00000 | 0.99034 | 1.00000 | 1.00000 |
| 25 cm   | 0.98751 | 1.00000 | 1.00000 | 1.00000 | 1.00000 | 1.00000 | 1.00000 |
| 50 cm   | 0.97826 | 1.00000 | 1.00000 | 1.00000 | 1.00000 | 1.00000 | 1.00000 |
| 75 cm   | 0.96231 | 0.99250 | 0.99654 | 0.91951 | 1.00000 | 0.99230 | 0.80936 |
| 100 cm  | 0.99087 | 0.78904 | 0.94038 | 1.00000 | 0.95390 | 1.00000 | 1.00000 |
| 125 cm  | 0.47607 | 0.00000 | 0.97336 | 0.99876 | 0.77533 | 0.18063 | 0.07891 |
| 150 cm  | 0.00000 | 0.00000 | 0.00348 | 0.46191 | 0.00000 | 0.00110 | 0.00000 |
| 175 cm  | 0.00000 | 0.00000 | 0.18581 | 0.00000 | 0.00000 | 0.01339 | 0.00000 |

For showing the analysis result attained in the step A more vividly, as show in FIG. 1, the step D is preferable to visualize the interrogation zone with detailed environmental information such as the size of the interrogation zone, the shape of the interrogation zone, the best deploying spot in the interrogation zone, the worst deploying spot in the interrogation zone, and etc. As a result, though the step D is optional (framed with broken line as shown in FIG. 1), it can facilitates the detection of the best deployment alternatives relatively.

Figure 4:
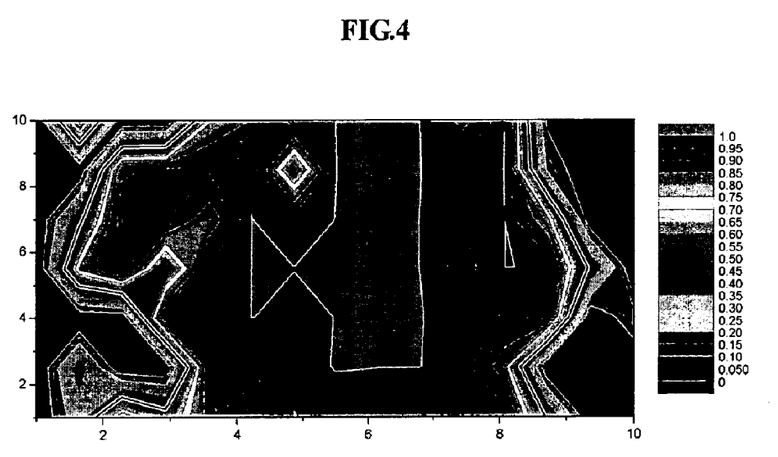
FIG. 4 illustrates the analysis result of the interrogation zone in a form of contour map in accordance with the step D illustrated in FIG. 1.
Figure 5:
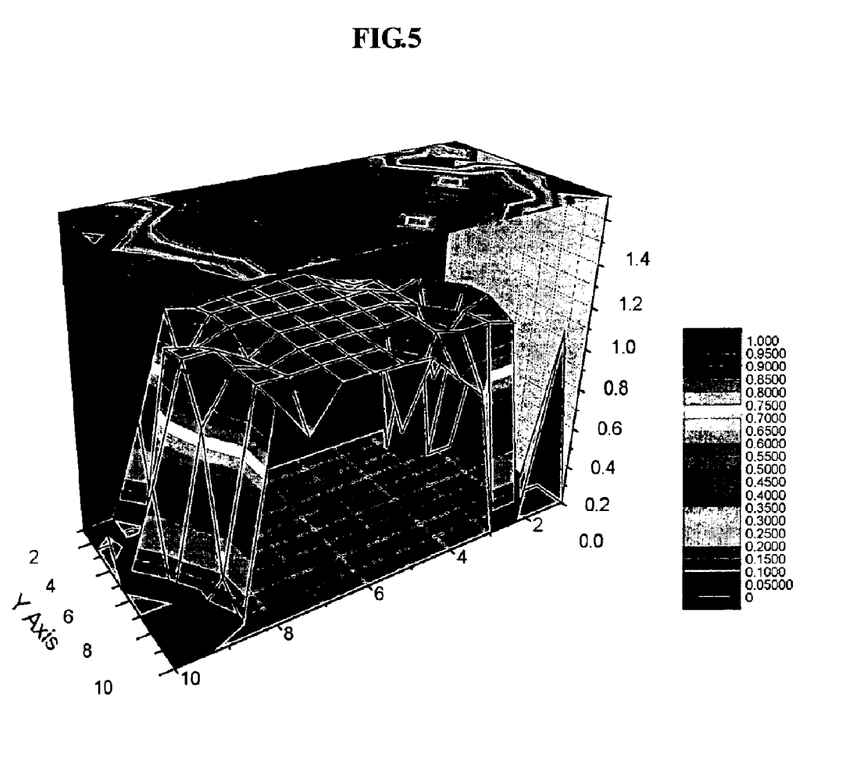
FIG. 5 illustrates the analysis result of the interrogation zone in a form of surface diagram in accordance with the step D illustrated in FIG. 1.

For example, as shown in FIG. 4, the analysis result of the interrogation zone attained in the step A is displayed in a form of contour map. The readability of RFID tag at each spot within the defined interrogation zone is indicated by different grey scales. At the same time, the size and shape of the interrogation zone can be easily read out from the FIG. 4, and the best or the worst deploying spot of RFID tag within the interrogation zone also can be detected out clearly. While for another example, as shown in FIG. 5, the analysis result of the interrogation zone attained in the step A is displayed in a form of surface diagram similarly.

As shown in FIG. 1, the step B is necessary since it is framed with real line. The purpose of the step B is to identify the readability of RFID tag associated with different sets of placement on the target object while the target object is presented inside the interrogation zone.

Typically, the RFID tag is attached on the target object according to experience. If the RFID tag can be read by the RFID antenna associated with one set of placement, then the set of placement will be selected as the solution of the RFID deployment. However, the performance of the selected RFID deployment alternative is unstable due to diverse environmental factors of the interrogation zone and/or various material of the target object, and the RFID reading accuracy of the whole RFID-based system may be very poor ultimately.

In order to not only figure out which set of placement can be read within the interrogation zone, but also to provide a quantitative and qualitative measure on the readability of RFID tag within the interrogation zone, the present invention details the step B by the following sub-steps as shown in FIG. 1:

B-1. placing at least one RFID antenna around the gateway of the interrogation zone;

B-2. placing at least one RFID tag on the target object associated with one set of placement;

B-3. capturing the RFID reading data while the target object is passing through the gateway of the interrogation zone, and identifying the readability of RFID tag associated with the set of placement based on the RFID reading data;

and then repeating the step B-2 and B-3 associated with another set of placement.

Figure 6:
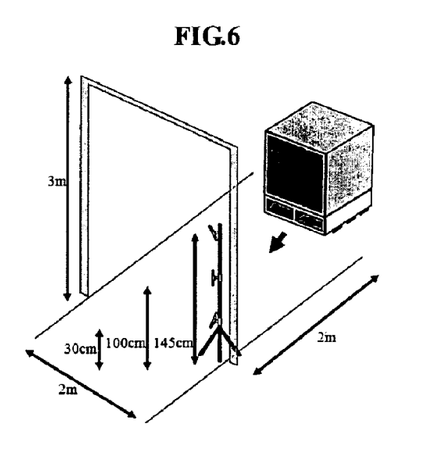
FIG. 6 illustrates placement of RFID antenna in accordance with the step B-1 illustrated in FIG. 1.
Figure 7:
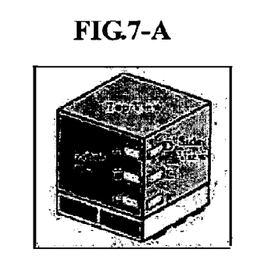

FIG. 6 illustrates placement of RFID antenna in accordance with the step B-1, and FIG. 7-A to FIG. 7-F illustrates six sets of placement for placing RFID tag in accordance with the step B-2.

As shown in FIG. 6, a gateway mounting with three antennas is located at one side of the gateway and the height of antennas is 30 cm, 100 cm and 145 cm representatively.

The RFID tag is attached on the target object (a carton, a pallet, or etc.) associated with different sets of placement, and RFID reading data concerned with readability of RFID tag is captured in real time while the target object is dynamically passing through the gateway. And each set of placement for placing RFID tag comprises the position and the orientation of the RFID tag. More detailed, three sets of position are defined as the front of the target object, the side of the target object and the corner of the target object; at the same time two sets of orientation which could be applied in each position are defined as vertical and horizontal.

As a result, there are six sets of placement for placing RFID tag totally: as shown in FIG. 7-A, the position is corner and the orientation is vertical for the first set; as shown in FIG. 7-B, the position is corner and the orientation is horizontal for the first set; as shown in FIG. 7-C, the position is side and the orientation is vertical for the first set; as shown in FIG. 7-D, the position is side and the orientation is horizontal for the first set; as shown in FIG. 7-E, the position is front and the orientation is vertical for the first set; and as shown in FIG. 7-F, the position is front and the orientation is horizontal for the first set.

To measure the readability of RFID tag associated with each set of placement, a forklift truck with a pallet is passing through the gateway at 5 km/hr in accordance with the step B-3. By comparing the readability of RFID tag associated with each sets of placement, the best position and orientation for placing the RFID tag could be determined.

As shown in FIG. 1, the step E (framed with broken line) is preferable to graphically visualize the readability of RFID tag associated with each set of placement which is measured in the step B. And more preferably, the readability of RFID tag associated with each set of placement is displayed in a form of line chart against time as shown in FIG. 8 to FIG. 12. Wherein the x-axis represents the different interaction between the RFID antenna and the RFID tag while the y-axis represents the number of responses from the RFID tag detected by the antenna, hence the line chart indicating the readability of RFID tag against time. Furthermore, the shape of the curve indicates the readability of RFID tag while the RFID tag passes through the gateway.

Figure 8:
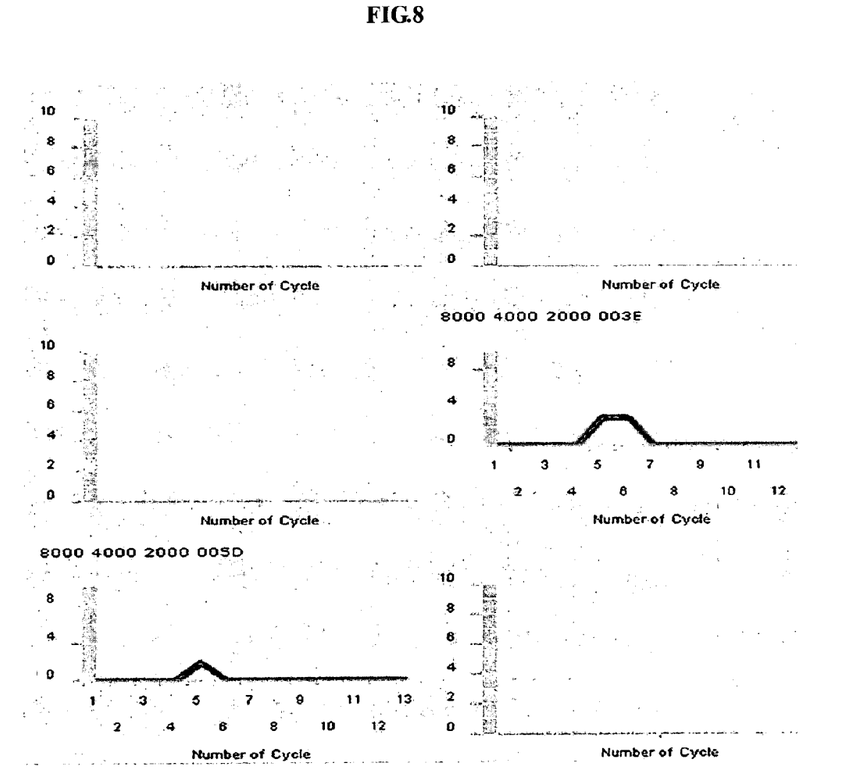
FIG. 8 illustrates line charts of the readability of RFID tag associated with the fifth set of placements illustrated in FIG. 7-E.
Figure 9:
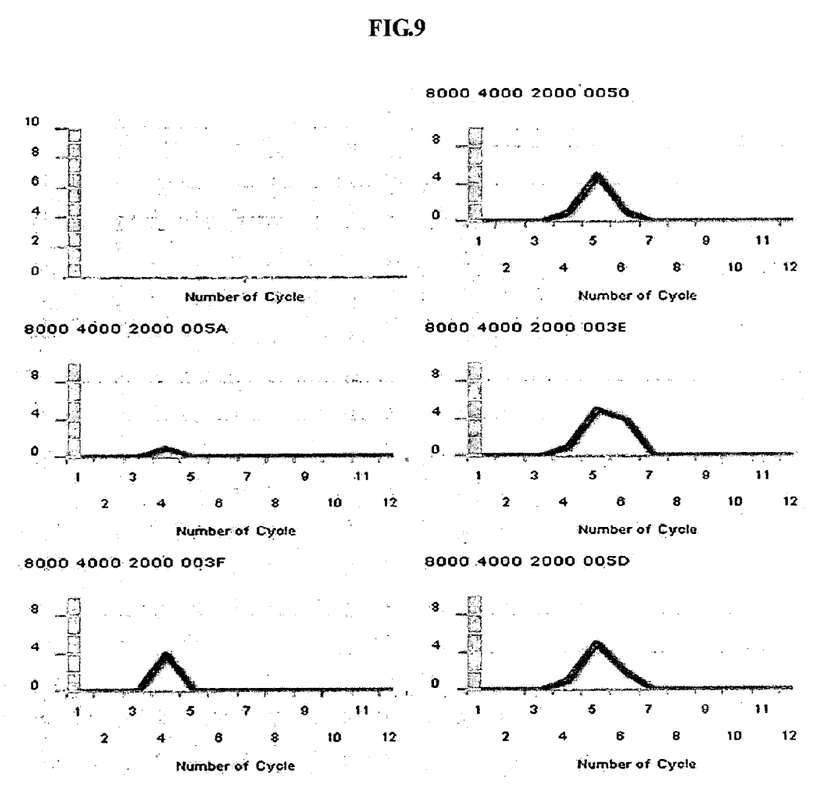
FIG. 9 illustrates line charts of the readability of RFID tag associated with the sixth set of placements illustrated in FIG. 7-F.

For comparing the readability of RFID tag associated with different orientations, the FIG. 8 illustrates line charts of the readability of RFID tag associated with the fifth set of placements illustrated in FIG. 7-E while the FIG. 9 illustrates line charts of the readability of RFID tag associated with the sixth set of placements illustrated in FIG. 7-F. And it is visible that the readability of RFID tag associate with horizontal orientation is better than vertical orientation by the above comparison.

Figure 10:
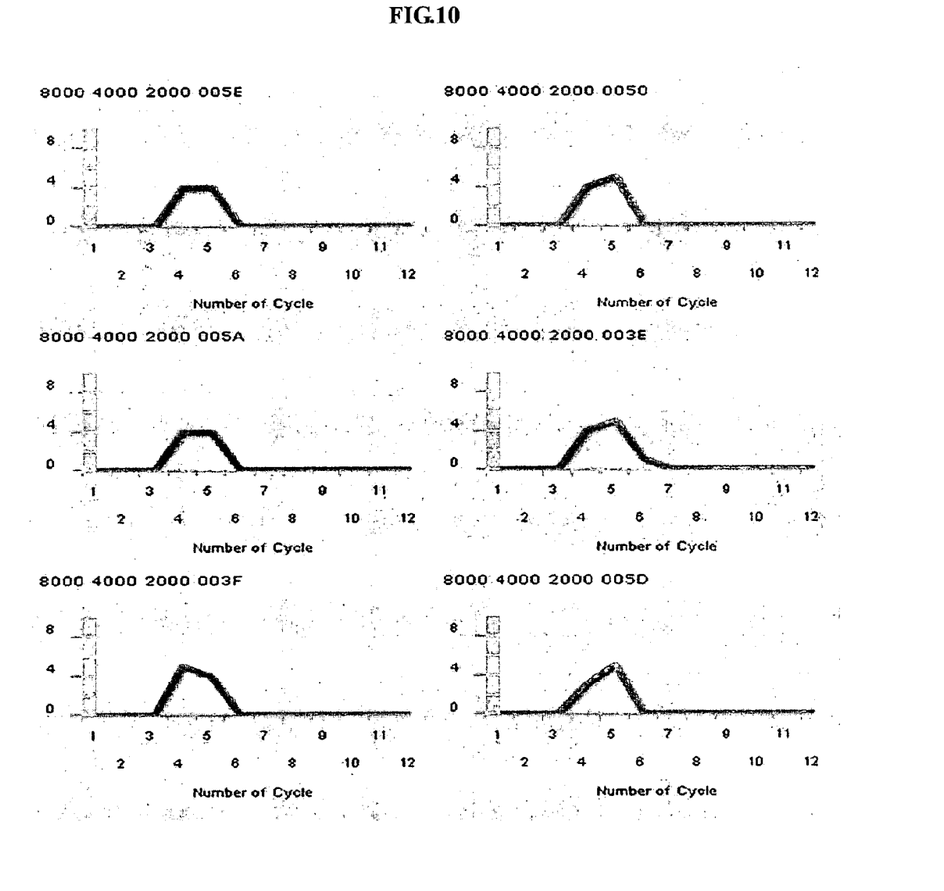
FIG. 10 illustrates line charts of the readability of RFID tag associated with the first set of placements illustrated in FIG. 7-A.
Figure 11:
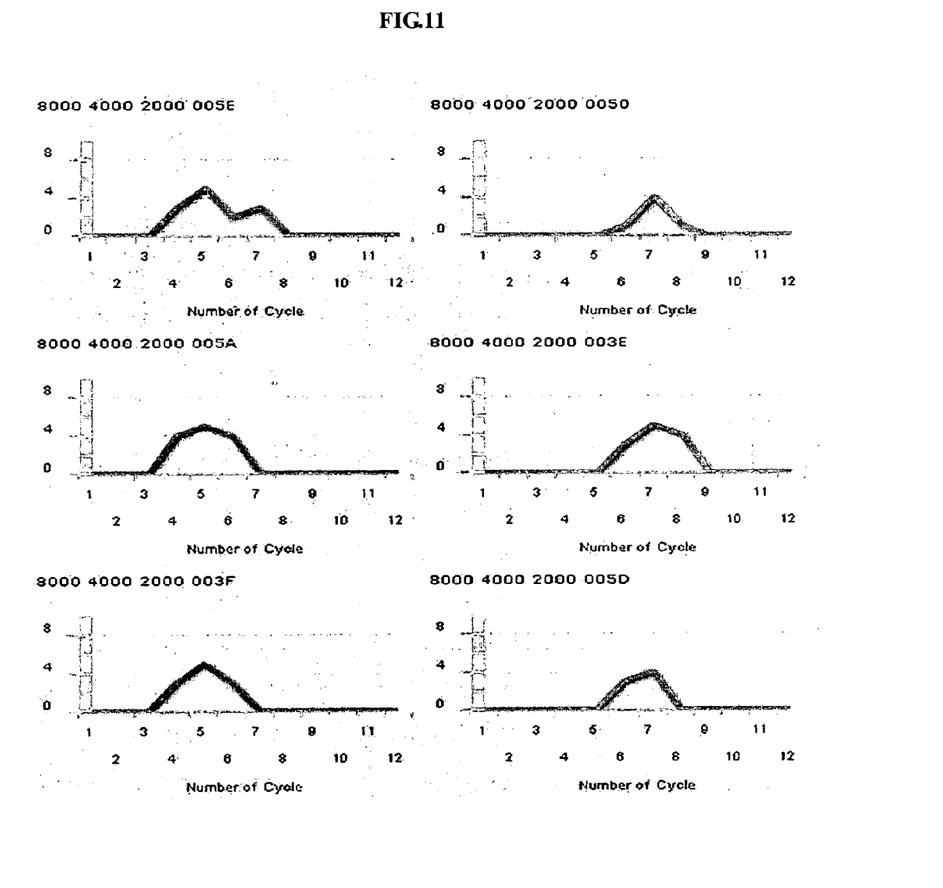
FIG. 11 illustrates line charts of the readability of RFID tag associated with the third set of placements illustrated in FIG. 7-C.
Figure 12:
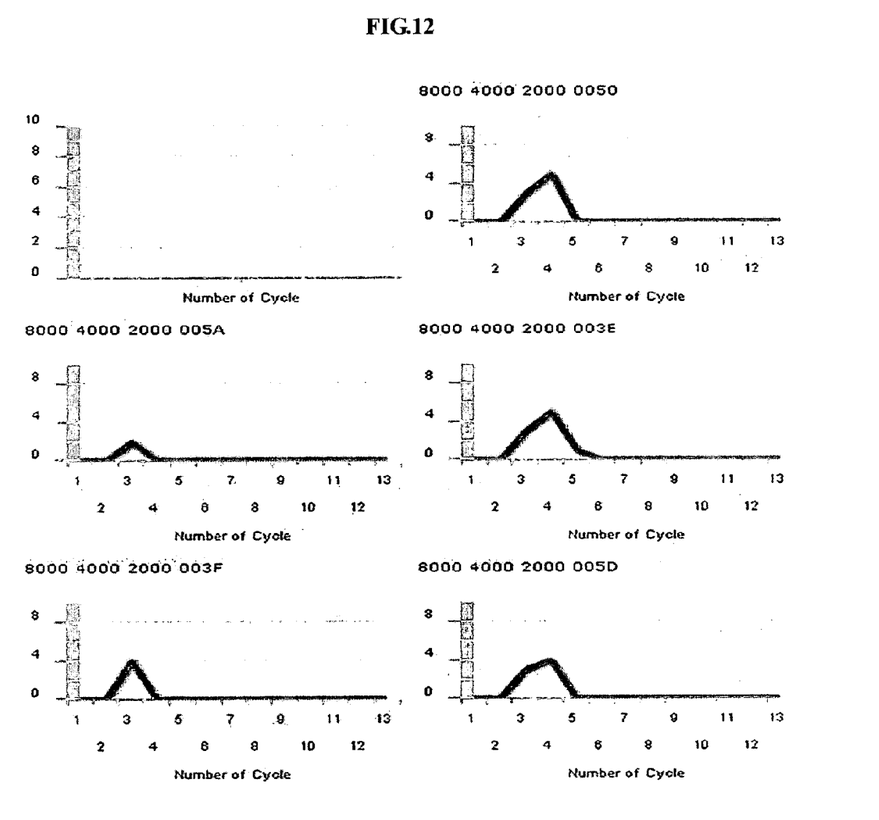
FIG. 12 illustrates line charts of the readability of RFID tag associated with the fifth set of placements illustrated in FIG. 7-E.

Similarly, for comparing the readability of RFID tag associated with different positions, the FIG. 10 illustrates line charts of the readability of RFID tag associated with the first set of placements illustrated in FIG. 7-A, the FIG. 11 illustrates line charts of the readability of RFID tag associated with the third set of placements illustrated in FIG. 7-C, while the FIG. 12 illustrates line charts of the readability of RFID tag associated with the fifth set of placements illustrated in FIG. 7-E. And it is visible that the front position is poorest.

Figure 13:
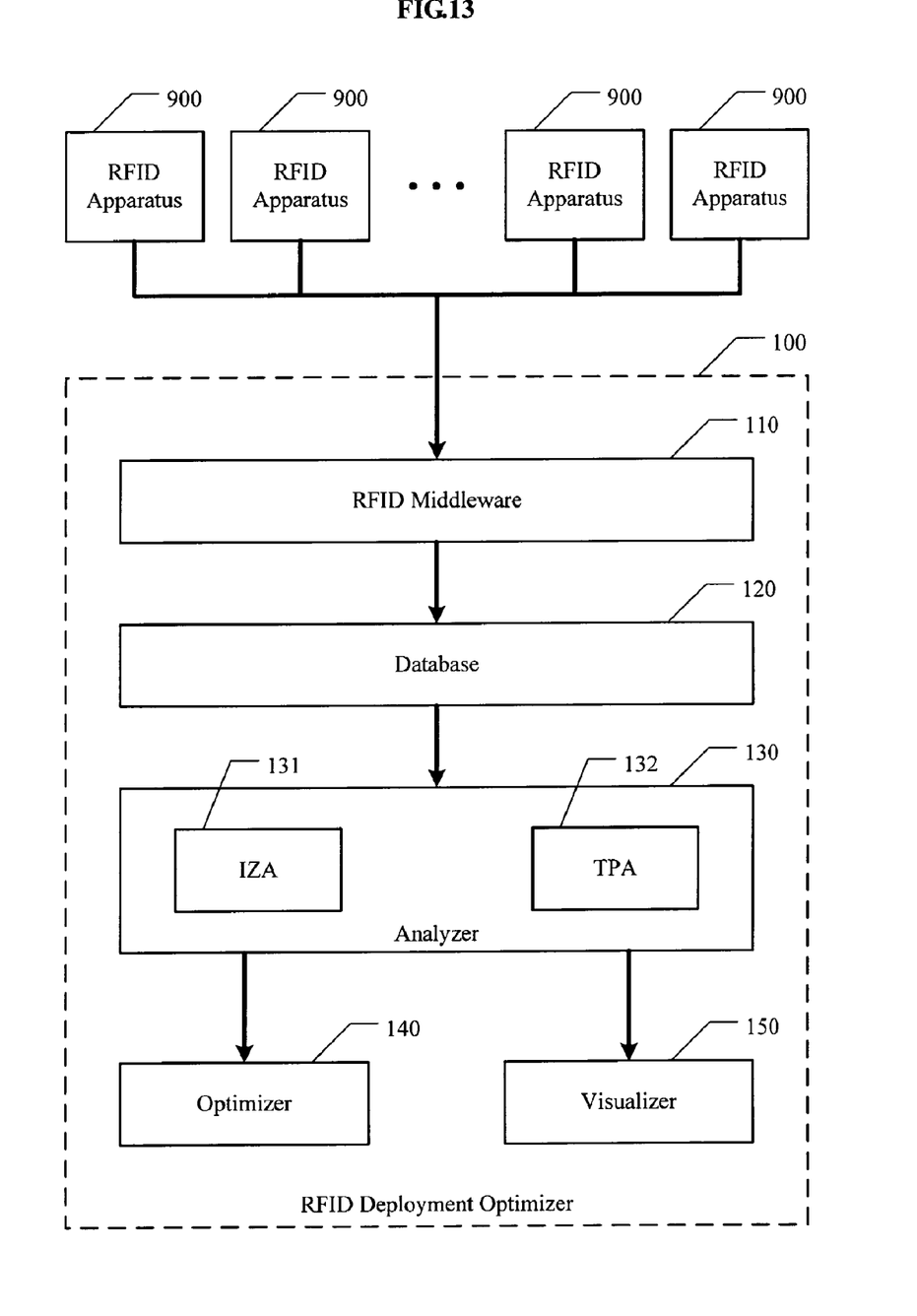
FIG. 13 illustrates a RFID deployment optimizer in accordance with an embodiment of the present invention.

As shown in FIG. 13, an embodiment of the RFID deployment optimizer 100 provided by the present invention comprises a RFID middleware 110, a database 120, an analyzer 130, an optimizer 140 and a visualizer 150.

The RFID middleware 110 communicates with the RFID apparatus 900 and sends RFID reading data to the database 120.

The database 120 stores the RFID reading data associated with different RFID deployment alternatives.

The analyzer 130 analyzes the RFID reading data stored in the database 120 to produce corresponding performance associated with different RFID deployment alternatives. Preferably, the analyzer 130 comprises an interrogation zone analysis unit (IZA) 131 for analyzing the interrogation zone where the RFID apparatus are deployed, and a tag placement analysis unit (TPA) 132 for identifying the readability of RFID tag associated with different sets of placement in the interrogation zone. And the IZA 131 is mainly running during the operation of the step A-3 illustrated in FIG. 1, while the TPA 132 is mainly running during the operation of the step B-3 illustrated in FIG. 1.

The optimizer 140 connects with the analyzer 130 for selecting the best RFID deployment alternative based on all the performances associated with different RFID deployment alternatives. And the optimizer 140 is mainly running for operating the step C illustrated in FIG. 1.

The visualizer 150 connects with the analyzer 130 for displaying the analysis result outputted by the analyzer 130 graphically. And the visualizer 150 is mainly running for operating the step D and E illustrated in FIG. 1.

The main advantages of the RFID deployment optimizer provided by the present invention are:

Firstly, the described RFID deployment optimizer and the method can quickly detect and collect large amount of useful data related to the environmental effect and deployment considerations. With these data, rich information about the RFID performance in different deployment alternatives will be analyzed and quantitative and qualitative measure will be provided. And thus deployment alternatives with poor performance will be avoided and overall RFID deployment performance and accuracy will be enhanced and guaranteed.

Secondly, the described RFID deployment optimizer and method can also be applied to find out the best combinations of hardware such as different readers and tags of different vendors.

Thirdly, the described RFID deployment optimizer and method can be applied immediately to on-site testing before RFID deployment. Particularly, when a deployment of RFID costs thousands to millions, the present invention can help the companies to find the best deployment and avoid pitfalls quickly and automatically.

The embodiments and examples set forth herein were presented in order to best explain the present invention and its particular application so as enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. An apparatus comprising:
    a middleware configured to receive, from a plurality of RFID apparatuses, readings from a plurality of RFID tags;
    an interrogation zone analysis unit coupled to the middleware and configured to perform a collection of a set of readings from the plurality of RFID tags respectively located at a set of locations in an interrogation zone, wherein the set of locations is included in a matrix and a location in the matrix for each of the plurality of RFID tags is known prior to the collection of the set of readings; and
    a tag placement analysis unit coupled to the middleware and configured to collect a reading of an RFID tag disposed at a placement on a target object located in the interrogation zone.

2. The apparatus of claim 1, further comprising a visualizer coupled to the interrogation zone analysis unit and configured to visually present a plurality of sets of readings from the plurality of RFID tags successively collected one set at a time, wherein the plurality of RFID tags are successively located at a corresponding plurality of sets of locations in the interrogation zone.

3. The apparatus of claim 1, further comprising a visualizer coupled to the tag placement analysis unit and configured to visually present a plurality of sets of readings from the RFID tag successively collected one reading at a time, wherein the RFID tag is successively disposed at a placement on the target object, and wherein the target object is successively located at a plurality of locations in the interrogation zone.

4. The apparatus of claim 1, further comprising a database coupled to the middleware, the interrogation zone analysis unit, and the tag placement analysis unit, wherein the database is configured to store the received readings.

5. The apparatus of claim 1, further comprising an optimizer coupled to the interrogation zone analysis unit or the tag placement analysis unit, wherein the optimizer is configured to select a deployment for the RFID apparatuses, based on the readings collected by the interrogation zone analysis unit, the tag placement analysis unit, or both.

6. The apparatus of claim 1, wherein the set of locations comprises one of n equally-distanced sets of m equally-spaced locations in the interrogation zone, where n and m are both integers and each is >1.

7. The apparatus of claim 1, wherein the placement on the target object comprises a selected combination of one of a frontal position, a sideways position, or a corner position with a selected one of a vertical orientation or a horizontal orientation.

8. A method comprising:
    successively collecting, with an interrogation zone analysis unit, a plurality of sets of readings from a plurality of RFID tags, wherein the plurality of RFID tags are successively located at a corresponding plurality of sets of locations in an interrogation zone, and wherein the corresponding plurality of sets of locations for each of the plurality of RFID tags are at a known location in a matrix prior to said successively collecting a plurality of sets of readings; and
    visually presenting, with a visualizer, the plurality of sets of readings from the plurality of RFID tags collected by the interrogation zone analysis unit.

9. The method of claim 8, further comprising:
    successively collecting, with a tag placement analysis unit, readings from an RFID tag successively disposed at a plurality of different placements on a target object; and
    visually presenting, with a visualizer, the readings from the RFID tag collected by the tag placement analysis unit.

10. The method of claim 9, further comprising selecting, with an optimizer, a deployment for RFID apparatuses based on the readings collected by the interrogation zone analysis unit, the tag placement analysis unit, or both.

11. The method of claim 9, wherein the placements on the target object comprise a selected combination of one of a frontal position, a sideways position, or a corner position with a selected one of a vertical orientation or a horizontal orientation.

12. The method of claim 8, wherein the corresponding plurality of sets of locations comprises n equally-distanced sets of m equally-spaced locations in the interrogation zone, where n and m are both integers and each is >1.

13. The method of claim 8, further comprising selecting with an optimizer, a deployment for one or more RFID apparatuses, based on the readings collected by the interrogation zone analysis unit.

14. A method comprising:
    successively collecting, with a tag placement analysis unit, readings from an RFID tag successively disposed at a plurality of different placements on a target object, wherein for each placement, the RFID tag is successively located at a plurality of locations in the interrogation zone, wherein the plurality of locations are included in a matrix, and wherein a corresponding location of the RFID tag in the matrix is known prior to said successively collecting readings; and
    visually presenting, with a visualizer, the readings from the RFID tag collected by the tag placement analysis unit.

15. The method of claim 14, further comprising selecting, with an optimizer, a deployment for RFID apparatuses based on the readings collected by the tag placement analysis unit.

16. The method of claim 14, wherein the placements on the target object comprise a selected combination of one of a frontal position, a sideways position, or a corner position with a selected one of a vertical orientation or a horizontal orientation.

* * * * *

UNITED STATES PATENT AND TRADEMARK OFFICE
CERTIFICATE OF CORRECTION

PATENT NO.         : 8,325,012 B2
APPLICATION NO.    : 12/521394
DATED              : December 4, 2012
INVENTOR(S)        : Kwok et al.

It is certified that error appears in the above-identified patent and that said Letters Patent is hereby corrected as shown below:

On the Title Page, in Item (57), under "ABSTRACT", in Column 2, Line 5, delete "o" and insert -- of --, therefor.

In the Specifications:

In Column 4, Line 22, delete "DETAIL" and insert -- DETAILED --, therefor.

In Column 5, Line 65, delete "Table.1" and insert -- Table 1 --, therefor.

In Column 5, Line 67, delete "Table.1" and insert -- Table 1 --, therefor.

In Column 6, Line 1, delete "alone" and insert -- along --, therefor.

In Column 6, Line 2, delete "Table.1" and insert -- Table 1 --, therefor.

In Column 6, Line 36, delete "show" and insert -- shown --, therefor.

In Column 9, Line 6, delete "as enable" and insert -- as to enable --, therefor.

Signed and Sealed this
Fourth Day of June, 2013

Teresa Stanek Rea
*Acting Director of the United States Patent and Trademark Office*